US010824660B2

(12) United States Patent
Jaidka et al.

(10) Patent No.: US 10,824,660 B2
(45) Date of Patent: Nov. 3, 2020

(54) SEGMENTING TOPICAL DISCUSSION THEMES FROM USER-GENERATED POSTS

(71) Applicant: ADOBE INC., San Jose, CA (US)

(72) Inventors: Kokil Jaidka, Bangalore (IN); Prakhar Gupta, Bangalore (IN); Sajal Rustagi, Punjab (IN); R. Kaushik, Bangalore (IN)

(73) Assignee: ADOBE INC., San Jose, CA (US)

( * ) Notice: Subject to any disclaimer, the term of this patent is extended or adjusted under 35 U.S.C. 154(b) by 650 days.

(21) Appl. No.: 14/950,550

(22) Filed: Nov. 24, 2015

(65) Prior Publication Data

US 2017/0147676 A1 May 25, 2017

(51) Int. Cl.
*G06F 16/35* (2019.01)

(52) U.S. Cl.
CPC .................................... *G06F 16/35* (2019.01)

(58) Field of Classification Search
CPC ........... G06F 17/30616; G06F 17/3071; G06F 17/30864; G06F 17/30011; G06F 17/30038; G06F 16/35
USPC ........................................................... 707/738
See application file for complete search history.

(56) References Cited

U.S. PATENT DOCUMENTS 7,590,612 B2 * 9/2009 Forrest .............. G06F 17/30905 706/55
8,438,224 B1 * 5/2013 Chirita ............... G06Q 30/0231 709/203
8,719,302 B2 * 5/2014 Bailey ..................... G06F 16/95 707/790
10,108,694 B1 * 10/2018 Moody ................. G06F 16/285
2010/0312769 A1 * 12/2010 Bailey ..................... G06F 16/95 707/740
2014/0278769 A1 * 9/2014 McCandless ...... G06Q 30/0201 705/7.31
2014/0379729 A1 * 12/2014 Savage ................ H04L 65/403 707/748

(Continued)

OTHER PUBLICATIONS

Qiang et. al. “Topic detection and tracking method for microblog”. CN-104484343-A. Apr. 1, 2015. English Abstract. pp. 1-2. (Year: 2015).*

(Continued)

*Primary Examiner* — Michael Pham
(74) *Attorney, Agent, or Firm* — Shook, Hardy & Bacon, L.L.P.

(57) ABSTRACT

Techniques are provided for detecting new topics and themes and assigning new posts to existing topic and/or theme clusters in online community discussions. A post posted to an online community is received and a post feature vector representative of the post is created. The post is compared to a plurality of centroid feature vectors, each centroid feature vector being representative of a respective post cluster and associated with a theme. Upon determining that similarity between the post feature vector and one of a plurality of centroid feature vectors satisfies a minimum similarity threshold, the post is assigned to the post cluster of which the centroid feature vector is representative. Upon determining that similarity between the post feature vector and any of the plurality of centroid feature vectors is below the minimum similarity threshold, a new theme cluster is created and the post is assigned to the new theme cluster.

3 Claims, 5 Drawing Sheets

THEME SEGMENTING ENGINE
USER-GENERATED POST RECEIVING COMPONENT 220
FEATURE VECTOR CREATING COMPONENT 222
ENTITY IDENTIFYING 228
ENTITY WEIGHT ASSIGNING 230
ENTITY WEIGHT UPDATING 232
SIMILARITY EVALUATING COMPONENT 224
POST ASSIGNING COMPONENT 226
ENTITY COMPARING 234
ENTITY ADDING 236
212
200
214
QUERY/THEME MATCHING ENGINE
238 QUERY RECEIVING
240 THEME IDENTIFYING
242 PRESENTATION
218 NETWORK
DATA STORE 216
210A USER COMPUTING DEVICE
210B USER COMPUTING DEVICE

(56) References Cited

U.S. PATENT DOCUMENTS

| | | | | |
|---|---|---|---|---|
| 2015/0081713 A1* | 3/2015 | Alonso | G06Q 10/109 | 707/738 |
| 2015/0149463 A1* | 5/2015 | McCandless | G06F 16/35 | 707/737 |
| 2016/0004764 A1* | 1/2016 | Chakerian | G06F 17/212 | 707/737 |

OTHER PUBLICATIONS

Qiang et. al. "Topic Detection and Tracking method for microblog" . Apr. 1, 2015. CN104484343. Electronic Translation. pp. 1-8 (Year: 2015).*

Ahmed et. al. "Protests against #delhigangrape on Twitter: Analyzing India's Arab Spring". Nov. 21, 2013. eJournal of eDemocracy and Open Government. vol. 5 issue 1, pp. 28-58. (Year: 2013).*

Ahmed, S., & Skoric, M. M. (Jan. 2014). My name is Khan: The use of Twitter in the campaign for 2013 Pakistan General Election. In System Sciences (HICSS), 2014 47th Hawaii International Conference on (pp. 2242-2251). IEEE.

Blei, D. M., Ng, A. Y., & Jordan, M. I. (2003). Latent dirichlet allocation. Journal of machine Learning research, 3(Jan), 993-1022.

De Mazancourt, C., & Dieckmann, U. (2004). Trade-off geometries and frequency-dependent selection. The American Naturalist, 164(6), 765-778.

Guille, A. (2014). Diffusion de l'information dans les médias sociaux: modélisation et analyse (Doctoral dissertation, Université Lumière Lyon 2). 190 pages. (In French with English-language abstract.).

Mathioudakis, M., & Koudas, N. (Jun. 2010). Twittermonitor: trend detection over the twitter stream. In Proceedings of the 2010 ACM SIGMOD International Conference on Management of data (pp. 1155-1158). ACM.

Mehrotra, R., Sanner, S., Buntine, W., & Xie, L. (Jul. 2013). Improving Ida topic models for microblogs via tweet pooling and automatic labeling. In Proceedings of the 36th international ACM SIGIR conference on Research and development in information retrieval (pp. 889-892). ACM.

Phan, X. H., Nguyen, L. M., & Horiguchi, S. (Apr. 2008). Learning to classify short and sparse text & web with hidden topics from large-scale data collections. In Proceedings of the 17th international conference on World Wide Web (pp. 91-100). ACM.

Sayyadi, H., Hurst, M., & Maykov, A. (May 2009). Event detection and tracking in social streams. In Proceedings of the Third International ICWSM Conference (pp. 311-314). AAAI.

Weng, J., & Lee, B. S. (2011). Event detection in Twitter. In Proceedings of the Fifth International AAAI Conference on Weblogs and Social Media (pp. 401-408). AAAI.

Zhao, W. X., Jiang, J., Weng, J., He, J., Lim, E. P., Yan, H., & Li, X. (Apr. 2011). Comparing twitter and traditional media using topic models. In European Conference on Information Retrieval (pp. 338-349). Springer, Berlin, Heidelberg.

* cited by examiner

SEGMENTING TOPICAL DISCUSSION THEMES FROM USER-GENERATED POSTS

BACKGROUND

Various online communities host user-generated content organized as a hierarchy of forums, discussions and posts. An "online community" refers to a virtual community whose members interact with one another primarily via the internet. That is, an online community refers to a network of people who communicate with one another through interactive tools such as email, discussion boards, chat systems, and the like. Online communities can vary in size and in scope and are important knowledge bases that provide, for example, troubleshooting, information and timely help to users' questions. In one example, a social network can be considered a large online community discussing various interlinked topics. In another example, users of a software product may belong to a closed online community where they discuss only the aspects of the product. In the former case, there may be several million active users at any given minute and millions of posts every second. Such volumes of information make it overwhelming for a user looking for specific information or interested in tracking one particular topic or theme over time. In the latter case, finding answers quickly to particular concerns or queries in a forum-type setting can be difficult. Further, in browsing from post-to-post, it is difficult for users to quickly drill into aggregate information, drill into posts about certain themes, and then drill back out to the aggregate information to understand the broader topic more vividly.

SUMMARY

Embodiments of the present invention are directed to detecting topical discussion themes and segmenting such themes in online community discussions. Embodiments further are directed to assigning incoming user-generated posts to already existing themes when an appropriate level of similarity exists. As described herein, for each incoming user-generated post that is received, a post feature vector is created that represents an array of the entities (i.e., meaningful pieces of information) contained within the content of the post. Each post feature vector is compared to multiple centroid feature vectors, each centroid feature vector being representative of the entities derived from the content of all posts belonging to a cluster of posts having similar content. Each cluster of posts generally is representative of a theme that is common among the cluster posts. If it is determined that the post feature vector exhibits sufficient similarity to one or more of the centroid feature vectors, the post represented by the post feature vector is assigned to the cluster that has the similar theme and the entities comprising the post feature vector are added to the centroid feature vector. If, however, it is determined that the post feature vector fails to exhibit sufficient similarity to any of the centroid feature vectors, a new theme or topic is created and the user-generated post becomes the inaugural post assigned to the new theme.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
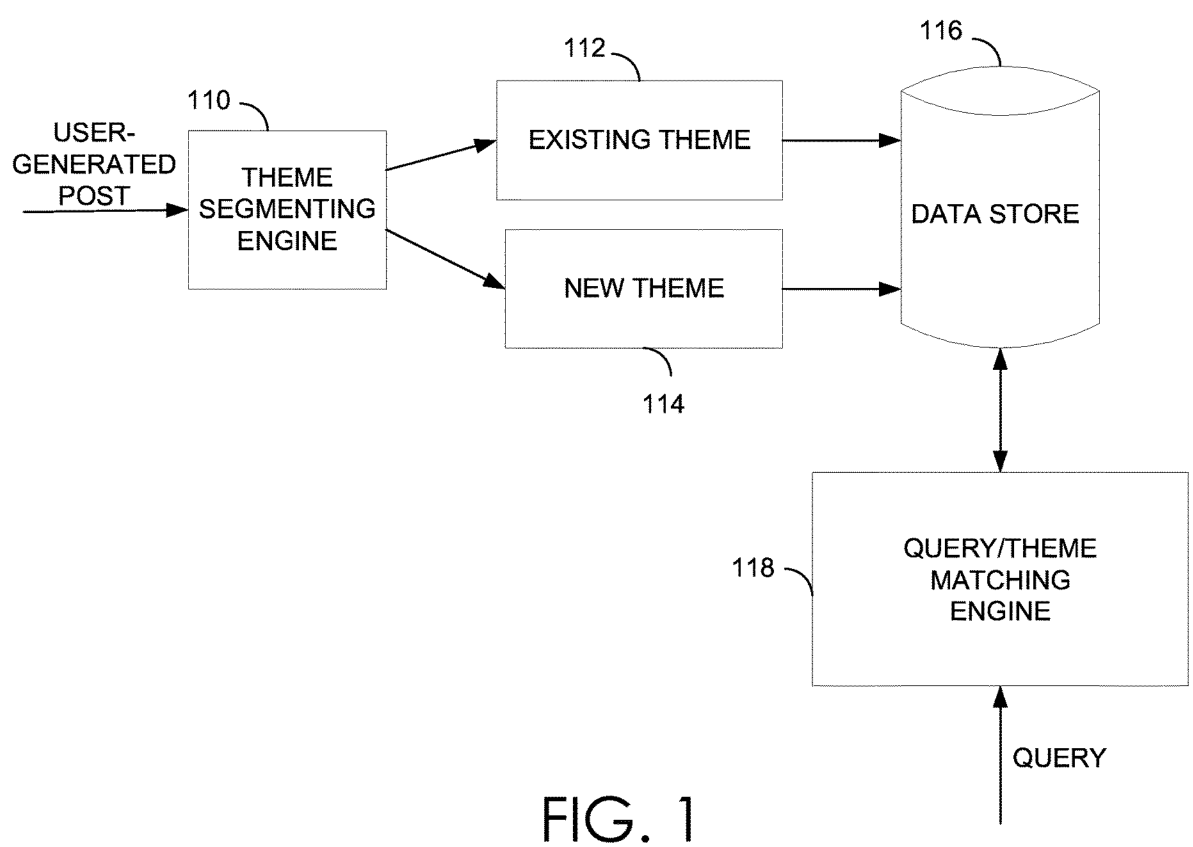
FIG. 1 is a block diagram showing an exemplary system for identifying and segmenting topical discussion themes from user-generated posts and for responding to user queries for information segmented into topical discussion themes, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Online communities oftentimes are searched by users to identify or track specific information related to a topic or theme. Due, in part, to the extensive amounts of information provided, locating desired information can be time consuming and inefficient. To facilitate user information searches in online communities, various entity attempts have been made to detect topics and/or themes of posts with limited effectiveness. For example, detecting a broader topic has been done on online social media platforms (e.g., FACEBOOK and TWITTER) through the generation of word-clouds of high-frequency words and hashtags with a review panel identifying new and emergent (e.g., trending) topics. Detecting themes within a topic similarly has been attempted via this rote counting method by identifying themes within the topic based on the size of the word-clouds associated with additional words and/or hashtags that occur within the larger topic word-cloud. Topic detection also has been performed utilizing the recency of posts; that is, by identifying "trending topics" from the most recent posts in the community.

In addition to entity grouping attempts, academics have attempted to group user-generated content, for instance, using a k-nearest neighbor approach to identify "bursty" themes (that is, themes occurring with a discernible sudden increase in frequency followed by a discernible decrease in frequency), using hashtag-based schemes to improve topic modeling in short-text-based social communities, using dictionary learning to identify post clusters, and by clustering posts solely based on their cosine similarity with each other. Such conventional topic and/or theme detection implementations, however, do not efficiently and/or effectively address identifying new themes and assigning incoming posts to existing themes based upon entity similarity. Further, such conventional approaches do not effectively leverage the temporality of posts, which is an important characteristic of conversations in an online community.

As such, embodiments of the present invention are directed to detecting new topics and/or themes and assigning new posts to existing topic and/or theme clusters in online community discussions. Themes generally refer to facets of a broader topic and, accordingly, use of the term "theme" herein is intended to encompass both topics and themes. As described herein, themes are identified using content, timeline, and user-based features of posts. In particular, text, time, and user-based features are identified from incoming user-generated posts and utilized to represent the posts as a vector of weighted entities. Text, time, and user-based features can include inverse cluster frequency (which measures the unique presence of text within the content of a post/theme), time decay (which allows for decay of old entities with the passage of time to preserve the homogeneity and the freshness of themes), user interests (which profiles posters and commenters on the bases of posts in their respective profiles), and user participation (which describes posters and commenters that have participated in the post discussion or all posts within a theme).

An incremental clustering method is used to compare feature vectors created for the incoming posts against centroid feature vectors representative of existing themes and to detect new themes as they emerge. Generally, a centroid feature vector is a feature vector that represents a set of posts associated with a theme. The clustering technique for segmenting themes generally is based on how closely post content resembles, and is contained within, existing themes, while incorporating natural decay of old themes over time. Further, new theme detection is based not only on the uniqueness of content but also on temporal distance from existing themes. The incremental clustering approach described herein emulates the real-time nature of user-generated posts in an online community or network. The data considered for evaluation of cluster-specific features at a particular time can include documents (i.e., content) from an incoming content stream that bear timestamps less than or equal to the prior evaluation time window's end time.

Embodiments of the invention compare the similarity between an incoming user-generated post and a plurality of clusters each represented by the centroid of all its respective posts. A cluster centroid is represented as a feature vector that includes weighted entities derived from all posts comprising a cluster associated with a theme. This approach saves both time of computation and space as it avoids comparing each post against every other post in every cluster and, instead, compares feature vectors representing each post against centroid feature vectors representing existing clusters.

As more fully described below, each incoming user-generated post is represented as a vector of weighted entities. Entities in the posts are statistically weighted by using term frequency and inverse document frequency after normalization, among other measures. A cluster centroid is represented as a vector of all the entities from the posts which are present in the cluster. The weights of the entities in a cluster centroid are calculated in a similar manner to the calculation of weights in an incoming user-generated post, and are updated as appropriate. Then, for clustering, a variety of measures may be used in conjunction with simple term-statistical similarity metrics, to compare: (1) a post-feature-vector comprising post information (at the word-, n-gram, or phrase-level), and user information (represented by the number of users active in the post and its comments, the poster's interests, and the commenter's interests); and (2) several theme (cluster) feature vectors made up of text and user information from all of a theme's (cluster's) containing posts, as well as user information related to participating users and commenters, similar to (1) above. Generally, when the similarity between the post feature vector and one of the theme feature vectors satisfies a minimum similarity threshold, the incoming post is assigned to the post cluster associated with such a theme feature vector. On the other hand, when the similarity between the post feature vector and any of the theme feature vectors, a new theme cluster is created and the incoming post is assigned to the new theme cluster.

Various terms are used throughout this description. Descriptions of some terms are included below to provide a clearer understanding of the ideas disclosed herein:

A "centroid" of a cluster refers to a post or vector that represents an average of all posts contained within the cluster.

A "cluster" refers to a set of items that are grouped together based upon their similarity to one another.

An "entity" refers to any meaningful piece of information associated with a post. By way of example only, an entity could be an n-gram (e.g., words, phrases, etc.) of the textual content of the post, an n-gram of the textual content of one or more comments associated with the post, user content associated with a user that posted the post, user content associated with a user that commented in association with the post, information about when the post was posted, information about when any comments associated with the post were posted, other metadata associated with the post, a tag (e.g., a hashtag) attached to a post, or a label the author of the post has provided the post.

A "hashtag" refers to a word or phrase preceded by a hash or pound sign (#) that is used to identify messages on a specific topic. Hashtags are often used within a post to identify a keyword or topic of interest and facilitate search for it.

"Inverse post/theme frequency" or "inverse cluster frequency" refers to a derived feature which measures the unique presence of a text snippet within a post or theme. In embodiments, the inverse post/theme frequency may be calculated utilizing Equation 3, infra.

"Metadata" refers to a set of data that describes and gives information about other data. Generally, as utilized herein, metadata summarizes basic information about a post which can make finding and working with the content of the post easier. Common examples include, without limitation, author, creation date, modification date, file size and timestamps.

An "online community" refers to a virtual community whose members interact with one another primarily via the internet. That is, an online community refers to a network of people who communicate with one another through interactive tools such as email, discussion boards, chat systems, and the like. In one example, a social network can be considered a large online community discussing various interlinked topics. In another example, users of a software product may belong to a closed online community where they discuss only the aspects of the product.

A "post" refers to content published in an online community. Generally, a post is online content that is submitted to an online community and displayed for review by members of the online community.

A "post feature vector" refers to an array of the entities contained within the content of a post. Similarly, a "centroid feature vector" refers to an array of the entities that represent an average of all posts contained within the cluster.

A "theme" refers to a sub-topic within a broader topic. By way of example only, themes within the topic "birthday" may include the food, music, location, etc. associated with the birthday.

"Time decay" is applied to existing feature values to degrade the importance of old posts/themes.

"User interests" refers to items of importance to a user (e.g., content poster or content commenter). In embodiments, user interests may be derived from summary and evaluation of online profiles.

"User participation" refers to the participation of content posters and/or content commenters throughout a post discussion and/or in all post discussions comprising a theme.

By way of example, and with reference to FIG. 1, provided is a high-level example in which incoming posts are assigned to post clusters associated with existing topical discussion themes and in which new topical discussion themes are created, in accordance with the methods more fully described below. An incoming user-generated post is received at a theme segmenting engine 110. The user-generated post is, for instance, posted by a user at an online community forum and may be received by the theme segmenting engine 110 from the user's computing device or from a server associated with the online community. At the theme segmenting engine 110 (as more fully described below with reference to FIG. 2), a post feature vector is created for the user-generated post. The created post feature vector is an array that represents entities contained in the textual content of the user-generated post and its comments, the user content associated with the user-generated post's poster and commenters, community details about the online community at which each respective post was posted, and timestamp information about when the user-generated post and its comments were posted. The entities comprising the post feature vector are weighted, using a variety of measures more fully described below, such that the vector represents the relative importance of entities in the content of the post with a high degree of accuracy.

Also at the theme segmenting engine 114, the post feature vector for the user-generated post is compared to a plurality of centroid feature vectors. Each centroid feature vector is an array that represents the textual content of all (or multiple) posts assigned to a particular cluster of posts associated with a theme, the textual content of all (or multiple) comments on posts assigned to the particular cluster, user content associated with all (or multiple) posters and commenters for posts assigned to the particular cluster, community details about the online community or communities at which all (or multiple) posts assigned to the particular cluster were posted, and timestamp information about when all (or multiple) posts assigned to the particular cluster and its respective comments were posted. Each cluster having a centroid feature vector is representative of a plurality of posts having similar content, i.e., related to a theme.

Similarity between the post feature vector representing the user-generated post and the plurality of centroid feature vectors is assessed to determine if the post feature vector exhibits a sufficient degree of similarity to any of the centroid feature vectors to determine that the post should be added to the cluster represented by the centroid feature vector. If sufficient similarity is exhibited, the user-generated post is assigned to the existing theme 112 associated with the similar cluster. If sufficient similarity is not exhibited, a new theme 114 is created and the user-generated post becomes the inaugural post assigned thereto. The user-generated post, as well as its assignment, is stored in association with a data store 116.

Post content segmented into themes in accordance with embodiments hereof, permits users to efficiently identify and browse information concerning a particular theme that is posted to an online community. Queries received by a query/theme matching engine are compared against the content in the data store 116 and post clusters (segmented and organized by theme) are identified as relevant thereto. At least a portion of the content of the posts comprising the post cluster then may be presented to the user from whom the query was received.

Figure 2:
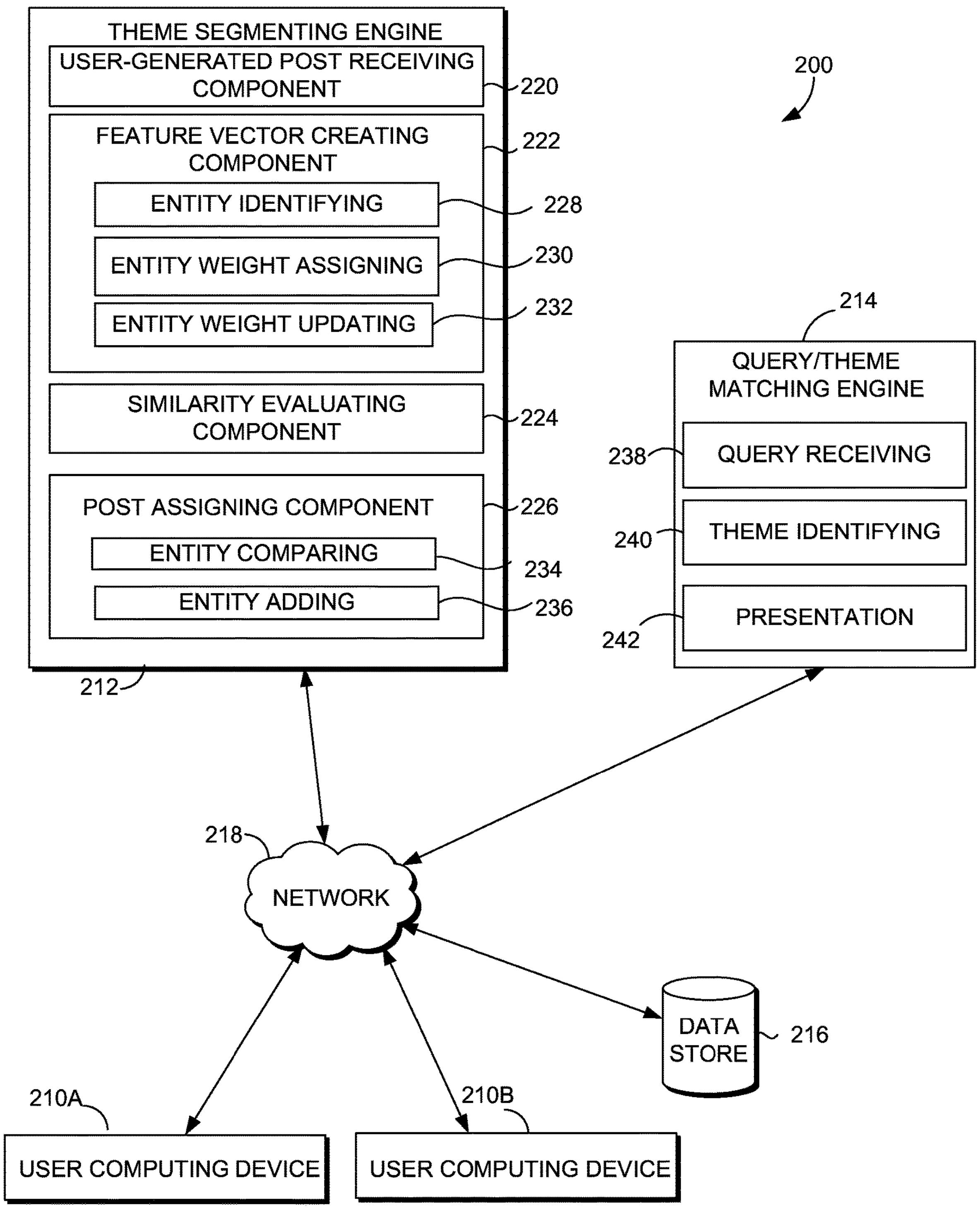
FIG. 2 is a block diagram showing another system for identifying and segmenting topical discussion themes from user-generated posts and for responding to user queries for information segmented into topical discussion themes, in accordance with an embodiment of the present invention.

Turning now to FIG. 2 a block diagram is provided illustrating an exemplary computing system 200 in which some embodiments of the present invention may be employed. Generally, the computing system 200 illustrates an environment in which incoming posts (i.e., content) posted to one or more online communities are assigned to post clusters associated with existing topical discussion themes and in which new topical discussion themes are created in accordance with the methods, for instance, illustrated in FIGS. 3 and 4 (more fully described below). Among other components not shown, the computing system 200 generally includes user computing devices 210A, 210B, a theme segmenting engine 212, a query/theme matching engine 214, and a data store 216, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of user computing devices 210A, 210B, theme segmenting engines 212, and/or query/theme matching engines 214 may be employed in the computing system 200 within the scope of embodiments of the present invention. Each may comprise a single device/interface or multiple devices/interfaces cooperating in a distributed environment. For instance, the theme segmenting engine 212 may comprise multiple devices and/or modules arranged in a distributed environment that collectively provide the functionality of the theme segmenting engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via one of the user computing devices 210A, 210B, the theme segmenting engine 212, the query/theme matching engine 214, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of theme segmenting engines, query/theme matching engines, and/or user computing devices. By way of example only, the theme segmenting engine 212 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

Each of the user computing devices 210A, 210B may include any type of computing device, such as the computing device 500 described with reference to FIG. 5, infra, for example. The user computing devices 210A, 210B generally are configured to receive textual input (generally input via an I/O component, such as a stylus or keyboard/keypad, via a user interface presented on an associated display screen and permitting alpha-numeric, shape-written and/or handwritten input into a designated input region, and/or via a voice input mechanism such as a microphone). Generally, each of the user computing devices 210A, 210B may be a desktop computing device having an external inputting component (such as an external keyboard, keypad, or the like), a mobile computing device having an inputting component that is separate and distinct from a display screen, or a mobile or desktop computing device having an inputting component integrated with the display screen thereof (e.g., a touchscreen keyboard/keypad, or the like). The user computing devices 210A, 210B in accordance with embodiments hereof may include any combination of external and integrated inputting devices. In embodiments, user computing devices suitable for use with embodiments of the present invention may include a microphone or other listening device for accepting voice input. Any and all such variations, and any combination thereof, are contemplated to be within the scope of embodiments of the present invention. It should be noted that the embodiments of the present invention are equally applicable to mobile computing devices and devices accepting gesture, touch and/or voice input and accordingly may have external and/or integrated cameras (not shown), motion detection mechanisms (not shown) and the like. Any and all such variations, and any combination thereof, likewise are contemplated to be within the scope of embodiments of the present invention.

In embodiments, the user computing device 210A is configured to receive text input by a user with the intent of posting such text to an online community forum. In embodiments, a user inputs text to the user computing device 210A in accordance with one or more of the methods described above. Upon completion of the text entry, the user selects to post the text to the online community forum. Once posted, the posted text is presented for viewing by authorized members of the forum. It will be understood by those having ordinary skill in the art that posted text may include content of a post or content of a comment made in association with a post (or other comment) and, accordingly, the user of the user computing device 210A may be a poster (author of the post itself) or a commenter (author of a comment associated with a previously posted post or comment).

Upon the user selecting to post the text of a post to the online community forum, the post is received by the theme segmenting engine 212 for assigning the post to an existing post cluster or creating a new post cluster associated with a new theme, as more fully described below. In accordance with embodiments hereof, posts are assigned to clusters associated with themes (or have new clusters associated with new themes created therefrom). Comments, however, are not assigned to clusters or themes in and of themselves. Rather, they are considered in assigning the underlying post to a cluster or theme, as more fully described below.

The user computing device 210B is configured to receive queries input by users seeking information about a particular topic or theme. In embodiments, a user inputs text to the user computing device 210B in accordance with one or more of the methods described above. Upon entry of a user query at the user computing device 210B, the query is received by the query/theme matching engine 214 to identify posts associated with one or more topics or themes to which the query appears relevant, as more fully described below. Upon identification of matching posts, at least a portion of the content of the matching posts is presented in association with the user computing device 210B.

The data store 216 is configured to store information related to user-generated posts. In various embodiments, such information may include, without limitation, user-generated posts, user-generated comments associated with existing posts (or other comments), post feature vectors, post clusters, and cluster centroid feature vectors. In embodiments, the data store 216 is configured to be searchable for one or more of the items stored in association therewith. It will be understood and appreciated by those of ordinary skill in the art that the information stored in association with the data store 216 may be configurable and may include any information relevant to user-generated posts, user-generated post comments, post clusters, post feature vectors, cluster centroid feature vectors, and/or the like. The content and volume of such information are not intended to limit the scope of embodiments of the present invention in any way. Further, though illustrated as a single, independent component, the data store 216 may, in fact, be a plurality of storage devices, for instance a database cluster, portions of which may reside in association with one of the user computing devices 210A, 210B, the theme segmenting engine 212, the query/theme matching engine 214, another external computing device (not shown), and/or any combination thereof.

The theme segmenting engine 212 is configured to receive user-generated posts and evaluate the content associated with the posts. The theme segmenting engine 212 further is configured to compare the evaluated content to existing post clusters to determine if particular posts relate to the same theme as one or more existing post clusters. If an incoming post is determined to relate to an existing theme, the post is added to the post cluster associated with that theme. If not, a new theme is created for the post. Still further, the theme segmenting engine 212 can update existing post clusters to ensure continued relevance.

The theme segmenting engine 212, as illustrated in FIG. 2, includes a user-generated post receiving component 220, a feature vector creating component 222, a similarity evaluating component 224, and a post assigning component 226. The user-generated post receiving component 220 is configured to receive user-generated posts, for instance, posted to an online community, as well as additional content associated with user-generated posts. In this regard, the user-generated post receiving component 220 is configured to receive comments posted in association with user-generated posts, as well as all data, metadata, tags, labels, and the like associated with user-generated posts. Thus, by way of example only, a received user-generated post may include one or more of textual content of the post and its comments, user content associated with the poster and any commenters, community details about the social community to which the user-generated post was posted, and time-based information about when the post and its comments were posted.

In embodiments, the user-generated post receiving component 220 is configured to receive incoming posts (and associated content) from one or more servers (not shown) associated with the online communities to which user-generated posts are posted. In other embodiments, the user-generated post receiving component 220 is configured to receive incoming posts (and associated content) from the user computing device 210A. Any and all such variations, and any combination thereof, are contemplated to be within the scope of embodiments of the present invention.

The feature vector creating component 222 is configured to create post feature vectors (i.e., arrays of weighted entities) that represent user-generated posts received by the theme segmenting engine 212. In embodiments, the framework is an unsupervised single pass incremental online clustering process that clusters a stream of incoming user-generated posts in real-time or near-real-time. The feature vector creating component 222 further is configured to create centroid feature vectors representative of all posts belonging to a cluster of posts having similar content and, thus, associated with a common theme. The process for creating post feature vectors and centroid feature vectors is largely the same, the difference being in the source and quantity of entities that are identified, evaluated and included in the resultant vector, as more fully described below.

The feature vector creating component 222 includes an entity identifying component 228, an entity weight assigning component 230, and an entity weight updating component 232. The entity identifying component 228 is configured to identify entities (i.e., meaningful pieces of information) contained within, or associated with, the content of received user-generated posts. In embodiments, entities are identified by syntactic and semantic parsing of all content comprising the user-generated posts including textual content of the post and its comments, user content (e.g., user interests and user profile characteristics) of the post's poster and commenters, community details about the online community at which the post is posted, and time-based information about when the post and its comments were posted. Identified entities are nouns, noun phrases, and words of known semantic categories such as persons' names, organizations' names, names of software products, and so on. In embodiments, certain frequent words (stop-words) are removed. Any method can be used to identify entities and embodiments described herein are not intended to be limited to any particular method for identifying entities.

The entity weight assigning component 230 of the theme segmenting engine 212 is configured to assign weights to the entities identified by the entity identifying component 228. In embodiments, initial weights are assigned to the entities using the normalized term or entity frequency, i.e., a proportion of the number of times a subject entity is found in the content of the post to a total number of entities found in the content of the post. One exemplary way to calculate the normalized entity frequency and, thus, the initial weight, of a subject entity is as follows:

$$w(\text{entity,post})=(1+\log_2 \mathrm{TF}_{(entity,post)})\times \mathrm{IDF}_{(entity)}, \quad \text{(Equation 1)}$$

wherein "w(entity, post)" is the initial weight (normalized entity frequency) of a subject entity, "$\mathrm{TF}_{(entity,\ post)}$" is the term frequency or frequency of the subject entity in the content of the post, and "IDF" is the inverse document or post frequency. TF and IDF are commonly calculated numerical statistics utilized by those having ordinary skill in the art and, accordingly, these terms are not further described herein. Note that while the above equation illustrates the calculation of an entity weight for an entity in the content of a post, the same calculation may be used to calculate weights for entities comprising the content of clusters as well. In such circumstances, calculated is the initial weight (normalized entity frequency) of a subject entity within all posts of a cluster, the frequency of the subject entity is determined in the content of all posts of the cluster, and the inverse document frequency likewise is determined as to the content of all posts of the cluster.

The entity weight assigning component 230 additionally is configured to identify entities containing known important words or important users which exist in the content of a post or are otherwise tagged in association with a post and "boost" (i.e., increase) the initial weight thereof. Such important words and/or users may be entered by the user or preset by the system. Boosting entities containing important words and users in the content of a post is useful as these entities often serve as good indicators of a theme of the post. The value of the boost weight can be set empirically or based on iterative updates. Below is an exemplary equation to boost a subject entity for a cluster centroid $C_i$ (that is, the entities comprising the centroid feature vector of a cluster of posts):

$$\text{normalized } tf_{entity} = \left(\text{boost}\times\left(0.5 \,\middle|\, \frac{0.5\times freq(\text{entity}, C_i)}{\max\{freq(e, C_i)\in C_i\}}\right)\right), \quad \text{(Equation 2)}$$

wherein "normalised $\mathrm{tf}_{entity}$" is the normalized entity or term frequency of the subject entity, and "freq(entity, $C_i$)" and "freq(e, $C_i$)" are the frequency with which the subject entity appears in the cluster centroid. Note that while the above equation illustrates the calculation of a boost weight for an entity of a cluster centroid, the same calculation may be used to calculate boost weights for entities comprising the content of individual posts as well. In such circumstances, the frequency with which the subject entity appears is evaluated as to the content of an individual post rather than a cluster centroid.

The entity weight assigning component 230 can alter the weights assigned to entities, boosting or decreasing the weights, as appropriate, based upon containment. The containment, c(A;B), of A in B reflects how much of A is roughly contained within B. For purposes of embodiments of the present invention, containment measures the importance of a subject entity (A) in the content of a post (B). For textual features, the number of times an entity is present in the content of a post may be measured as a fraction of the total number of entities present in the content of the post. As the number of entities in the content of a post increases, the relevance of one entity in the content of the post decreases. For user features, the presence of a user in a post and its comments may be measured as a fraction of the contributions of all users to the content of the post. Entities appearing relatively more frequently as a fraction of all entities in a post may have their weights boosted or increased, while entities appearing relatively less frequently may have their weights decreased. It will be understood by those having ordinary skill in the art that weights of entities comprising clusters may similarly be altered based on containment. In such circumstances, containment measures the importance of a subject entity in the content of all posts comprising the cluster. In embodiments, altering entity weight for entities of clusters may be performed by the entity weight updating component 232 of the vector creating component 212, during the process of updating centroid feature vectors, as more fully described below.

In addition to assigning weights to entities comprising newly received user-generated posts, the feature vector creating component 222 is configured to update weights assigned to entities associated with centroid feature vectors utilizing the entity weight updating component 232. The entity weight updating component 232 is configured to update the weights of entities associated with centroid feature vectors as new posts are added to the representative post clusters. In this regard, the entity weight updating component 232 can calculate the Inverse Theme Frequency (ITF) for the centroid feature vectors. The Inverse Theme Frequency shows the uniqueness of an entity within the content of the posts comprising a theme. For textual features, it represents the defining characteristics of a theme. For user features, it identifies the dominant participants in a theme. The intuition behind this feature is that posts belonging to different themes may share some entities and/or users; on the other hand, entities (and/or users) which are present in more than one theme should receive lower weights than those which are unique to a theme, because those that are unique will be more indicative of the theme contents. An exemplary equation for calculating Inverse Theme Frequency is below. In this equation, inverse theme frequency is represented by the interchangeable term "inverse cluster frequency" as every theme is represented as a cluster of posts containing similar content:

$$ICF(\text{entity}) = \frac{\left(1 + \log_{10}\left(\frac{\text{Total No Of Clusters}}{\text{No of Clusters in which the entity is present}}\right)\right)}{\max\{ICF(e), e \in \text{Cluster}}. \quad \text{(Equation 3)}$$

The entity weight updating component 232 of the feature vector creating component 222 might update the TF (term frequency) values assigned to entities associated with centroid feature vectors at various increments, as desired. In this regard, the TF (term frequency) values of every entity in a post can be separately updated with the addition of every post in the theme. For the first k posts of a theme, the inverse-theme-frequency (ITF) values are updated after the arrival of every n number of posts, so that the weights assigned to the initial entities have the most recent values. As new posts enter in a cluster, the TF of any entity present in the theme's feature vector is updated by the overall similarity calculated with the theme, and multiplied by the weight of the entity in the post, and then stored in its normalized form. Similarly, the inverse theme or cluster frequency (ICF) is updated too. For user features, an update may be based on the new users participating in the post or theme, or the same user participating multiple times.

The below represents an exemplary incremental update of feature weights algorithm that may be utilized within the scope of embodiments of the present invention:

```
1: for every Cluster Cj do
2:     for every entity k do
```

-continued

```
3:      Clusters_matched = 0
4:   for every Cluster Ck do
5:      if entity k present in Ck then
6:         Clusters_matched = Clusters_matched +1
7:   assign ICFk
```

Time-based features also may be used to gradually incrementally update the weight of entities over time, as well as gradually decay old entities and posts, for a theme. This measure captures the temporal shift of the weight of entities and adjusts their weight. In a theme which has been active for some time, consider an entity that was active since the time the theme was formed, and its term frequency value increased accordingly. If a new entity is included in the last few time slots, its term frequency value will be lower than the former. To keep track of the latest vocabulary, the values may be updated in a single timeslot, and the values gained by an entity over a time slot may be carried over to other time slots, but with a dampening factor. For user features, decay would be based on the recency of their activity.

The following equation represents decay in accordance with embodiments of the invention:

$$ntf(\text{entity}, C_i) - \text{updated} = \sum_{t=tnow}^{tnow-k} e^{-t/T} \times TF_t. \quad \text{(Equation 4)}$$

The parameter k is set to take into consideration the TF values of only last k hours and T is the decay factor. Then, entities below a certain threshold are removed. The below represents an exemplary filterentities ( ) algorithm that may be utilized to remove below-threshold entities in accordance with embodiments of the present invention:

```
1: for every Cluster Cj do
2:    calculate TF-ICF values for every entityi
3:    if TF-ICFentityi < trade off point then
4:       remove entityi from Cj's vocabulary
```

Post feature vectors include the weighted entities of the content of the post being evaluated for cluster or theme assignment. Centroid feature vectors include weighted entities of the content of all posts assigned to a cluster (the entities being identified and weighted as described herein for each post assigned to the cluster). Once entities of an incoming post have been weighted, and theme clusters have been updated, the similarity evaluating component 224 of the theme segmenting engine 212 is configured to evaluate the similarity of the post feature vector to the plurality of centroid feature vectors, taking into account the weighted entity values assigned by the feature vector creating component 222. Once compared, one or more similarity metrics are assigned to the post as it relates to each of the theme-specific centroid feature vectors.

In embodiments, the similarity evaluating component 224 is configured to evaluate similarity utilizing a number of different measures including, by way of example, resemblance, inverse cluster frequency, and cosine similarity formula. Inverse cluster frequency was described herein above with regard to updating weights for entities comprising centroid clusters. This measure similarly may be utilized to evaluate similarity between a new user-generated post and a plurality of clusters. In embodiments, one or more of these measures may be utilized. If more than one is utilized, the resultant similarity values may be combined, averaged, or the like, to arrive at a final similarity value.

Resemblance assesses similarity between a user-generated post (represented by its post feature vector) and existing themes (represented by their respective centroid feature vectors). In embodiments of the present invention, resemblance is calculated using Jaccard coefficient, which compares the intersection of weighted entities between the content of the post and the content of the cluster representative of the theme against the union of the content. An exemplary equation for calculating resemblance follows:

$$\text{Resemblance} = r(t, C_i) = \frac{|S(t) \cap S(C_i)|}{|S(t) \cup S(C_i)|}. \quad \text{(Equation 5)}$$

The intersection of the weighted entities between the content of the post and the content of the cluster representative of the theme (represented by the numerator of Equation 5) represents the quantity of weighted entities belonging to both the theme and the cluster. The union of the weighted entities between the content of the post and the content of the cluster representative of the theme (represented by the denominator of Equation 5) represents the collection of weighted distinct entities belonging to the post, the theme, or both. A Jaccard calculation is a common statistical measure known to those having ordinary skill in the art and, accordingly, is not further described herein.

Another potential manner in which similarity may be assessed is the cosine similarity formula. In the cosine similarity formula the similarity, $sim(p_i,C_i)$, between the post and the cluster centroid of an existing theme cluster is calculated utilizing a sum of the weights of all entities, both in the post and in the cluster centroid. Cosine similarity formula is a common statistical measure known to those having ordinary skill in the art and, accordingly, is not further described herein.

In embodiments, one or more of resemblance, inverse cluster frequency, and cosine similarity formula may be utilized to assess similarity. If more than one is utilized, the similarity evaluating component 224 is configured to combine, average, or otherwise aggregate resultant similarity values to arrive at a final similarity value.

The post assigning component 226 of the theme segmenting engine 212 is configured to assign user-generated posts to one or more post clusters (themes) based on the similarity calculated by the similarity evaluating component 224. If sufficient similarity exists (for instance, based on a predetermined similarity threshold) between the user-generated post and at least one existing theme, the post assigning component 226 is configured to assign the user-generated post to the at least one theme. If sufficient similarity does not exist between the user-generated post and at least one existing theme, the post assigning component 226 is configured to create a new theme and the user-generated post becomes the inaugural post assigned to a cluster represented by the new theme.

The below represents a post-assigning algorithm that may be utilized within the scope of embodiments of the present invention:

```
1: cluster_count=0
2: repeat
```

-continued

```
3:      p_i ← new post
4:      (entity_i) ← identify entities from p_i
5:      max_similarity = 0
6:      for all Clusters C_j do
7:           Similarity (p_i,C_j)
8:           if Similarity (t_i,C_j) > max_similarity then
9:                max_similarity ← Similarity (p_i,C_j)
10:          if max_similarity > threshold then
11:               p_i ← Ck
12:               addentities ((entity_i), Ck)
13:          else//p_i is not assigned to any cluster
14:               cluster_count = cluster_count + 1
15:               p_i ← new_Cluster
16:               add entities ((entity_i), new_Cluster)
17:     current time = time_of_arrivalti
18:     if current time ≥ time_slot_end then
19:               update ICFs( )
20:               filterentities ( )
21:               time_slot_end = time_slot_end + window size
22: until new post present
```

If a new theme is created for the user-generated post, the post feature vector becomes the initial centroid feature vector, at least until such time as another post is added to the cluster or the vector is otherwise updated as described herein above. To preserve the homogeneity of existing clusters and encourage the formation of new ones, low-frequency entities of the post feature vector may be removed by finding the best trade-off point in the curve. This is done using techniques known to those having ordinary skill in the art to find the point on the sorted frequency distribution which is the maximum distance from the line joining the lowest-frequency entity and the highest-frequency entity. In one example, a cut-off at the $95^{th}$ percentile may be utilized. In such an instance, only the top five percent of the entities are retained when the post feature vector becomes the initial centroid feature vector.

If, however, the user-generated post is assigned to an existing theme cluster, the post assigning component 226 is configured to evaluate the entities of the centroid feature vector and the post feature vector for the user-generated post and update the centroid feature vector in accordance therewith. In this regard, the post assigning component 226 includes an entity comparing component 234 and an entity adding component 236. The entity comparing component 234 compares the entities from the post feature vector for the user-generated post with the entities of the centroid feature vector of the theme cluster to determine whether any new entities are present that are not yet present in the centroid vector. If new entities are identified, the entity adding component 236 is configured to incorporate the new entities into the centroid feature vector representing the theme. The below represents an exemplary addentities algorithm that may be utilized by the entity adding component 236 of the post assigning component 226 within the scope of embodiments of the present invention:

```
1: for entity k in (entities) do
2:      if k present in cluster centroid then
3:      TF_k = TF_k + similarity // update TF_k
4:      else //k is not present in cluster centroid
5:      addentity (k,TF=1, ICF=1) // add entity k to cluster
```

Post content segmented into themes in accordance with embodiments hereof, permits users to efficiently identify and browse information concerning a particular theme that is posted to an online community. In this regard, the query/theme matching engine 214 of the system 200 of FIG. 2 is configured for receiving queries from users desiring to obtain information about a particular theme, identify posts relevant to the user query, and present at least a portion of the content of the relevant posts to the querying user. The query/theme matching engine 214 includes a query receiving component 238, a theme identifying component 240, and a presentation component 242.

The query receiving component 238 is configured to receive a query from a user, for instance, a user at user computing device 210B. In embodiments, the query is received upon user entry of the query into a designated query input area associated with the online community. In embodiments, the query receiving component 238 is configured to receive the query from one or more servers (not shown) associated with the online community to which the query was posted. In other embodiments, the query receiving component 238 is configured to receive the query from the user computing device 210B. Any and all such variations, and any combination thereof, are contemplated to be within the scope of embodiments of the present invention.

The theme identifying component 240 of the query/theme matching engine 214 is configured to identify one or more themes which are relevant to the received query. In embodiments, the theme identifying component 240 is configured to query the data store 216 to determine those themes having the greatest quantity of n-grams in common with the received query. Database querying techniques are known to those having ordinary skill in the art and it will be understood that any particular manner of searching the data store 216 for content relevant to a received query is not intended to limit the scope of embodiments of the present invention.

Once one or more themes are identified as relevant to the received query, the presentation component 242 is configured to transmit for presentation (e.g., in association with a presentation device associated with the user computing device 210B), at least a portion of the content of one or more posts belonging to the post cluster represented by the identified theme(s).

Figure 3:
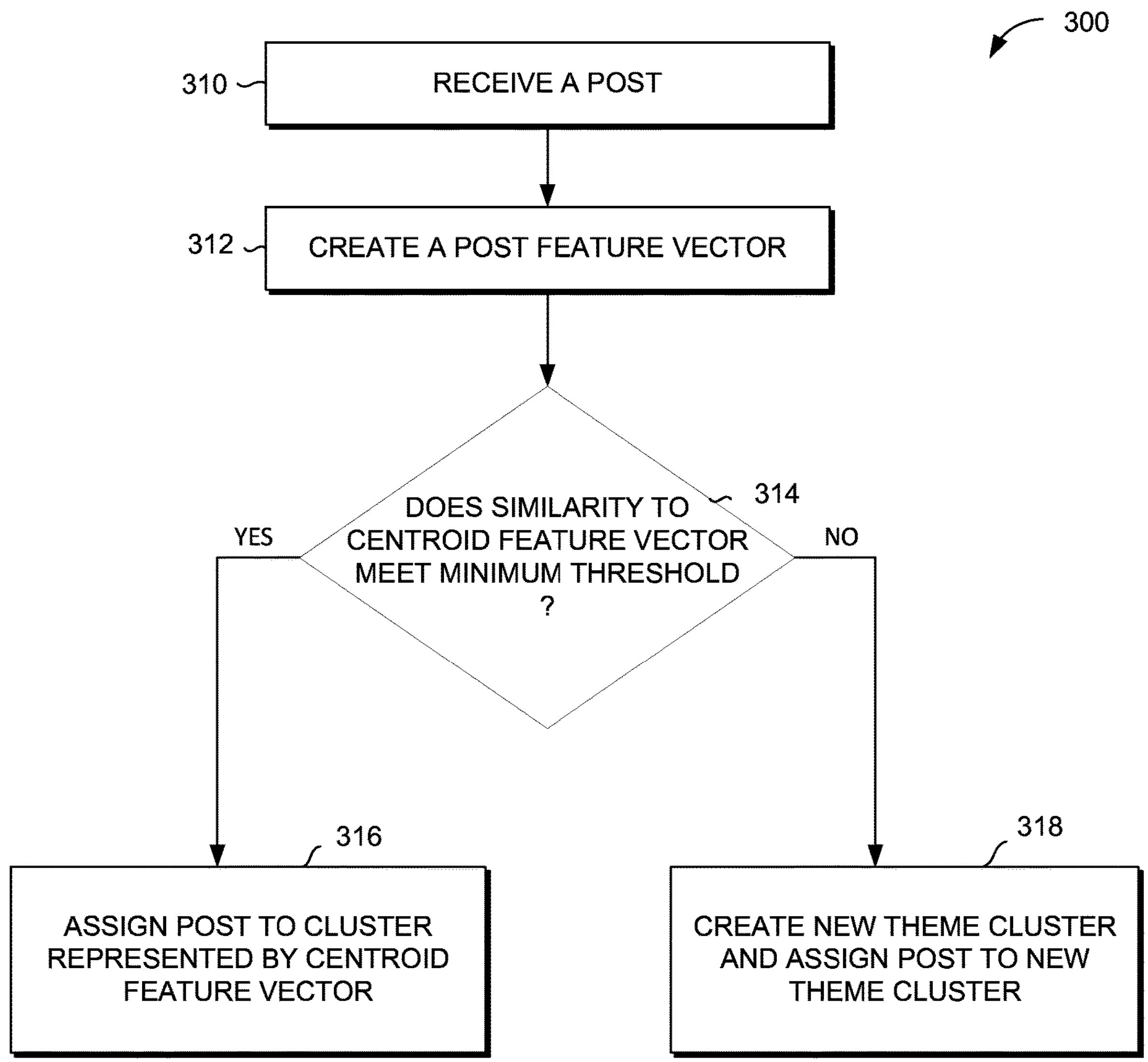
FIG. 3 is a flow diagram showing a method for assigning incoming posts to post clusters associated with existing topical discussion themes and creating new topical discussion themes, in accordance with an embodiment of the present invention.

Turning now to FIG. 3, a flow diagram is shown illustrating a method 300 for assigning incoming posts to post clusters associated with existing topical discussion themes and creating new topical discussion themes, in accordance with an embodiment of the present invention. Initially, as indicated at block 310, a user-generated post is received, for instance, a post posted to an online community. As indicated at block 312, a post feature vector representative of the post is created. The similarity between the post and a plurality of post clusters is assessed by comparing the post feature vector to a plurality of centroid feature vectors, each of the plurality of centroid feature vectors being representative of respective post cluster of the plurality of post clusters and associated with a theme. As indicated at block 314, it is determined if the similarity of the post to any centroid feature vector meets a minimum similarity threshold.

As indicated at block 316, upon determining that similarity between the post feature vector and one of the plurality of centroid feature vectors satisfies a minimum similarity threshold, the post is assigned to the post cluster of which the one of the plurality of centroid feature vectors is representative. Alternatively, as indicated at block 318, upon determining that similarity between the post feature vector and any of the plurality of centroid feature vectors is below the minimum similarity threshold, the method further comprises creating a new theme cluster and assigning the post to the new theme cluster.

Figure 4:
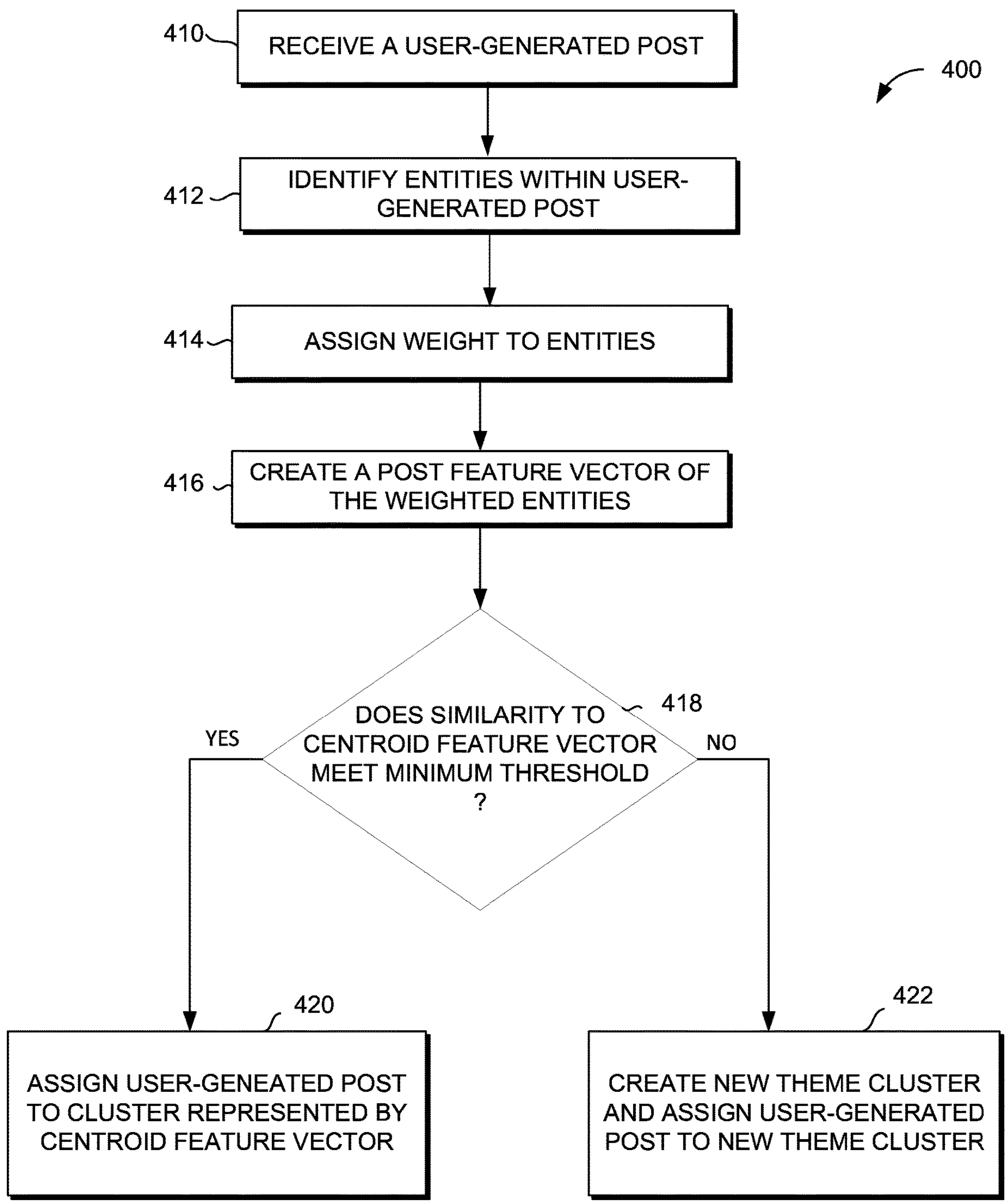
FIG. 4 is a flow diagram showing another method for assigning incoming posts to post clusters associated with existing topical discussion themes and creating new topical discussion themes, in accordance with an embodiment of the present invention.

Turning to FIG. 4, a flow diagram is shown illustrating another method 400 for assigning incoming posts to post clusters associated with existing topical discussion themes and creating new topical discussion themes, in accordance with an embodiment of the present invention. As indicated at block 410, a user-generated post is received, for instance, a post posted to an online community. As indicated at block 412, entities within the user-generated post are identified and, as indicated at block 414, weights are assigned to the identified entities. A post feature vector representative of the post is created, as indicated at block 416. The similarity between the post and a plurality of post clusters is assessed by comparing the post feature vector to a plurality of centroid feature vectors, each of the plurality of centroid feature vectors being representative of respective post cluster of the plurality of post clusters and associated with a theme. As indicated at block 418, it is determined if the similarity of the post to any centroid feature vector meets a minimum similarity threshold.

As indicated at block 420, upon determining that similarity between the post feature vector and one of the plurality of centroid feature vectors satisfies a minimum similarity threshold, the user-generated post is assigned to the post cluster of which the one of the plurality of centroid feature vectors is representative. Alternatively, as indicated at block 322, upon determining that similarity between the post feature vector and any of the plurality of centroid feature vectors is below the minimum similarity threshold, the method further comprises creating a new theme cluster and assigning the user-generated post to the new theme cluster.

Having described embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 5:
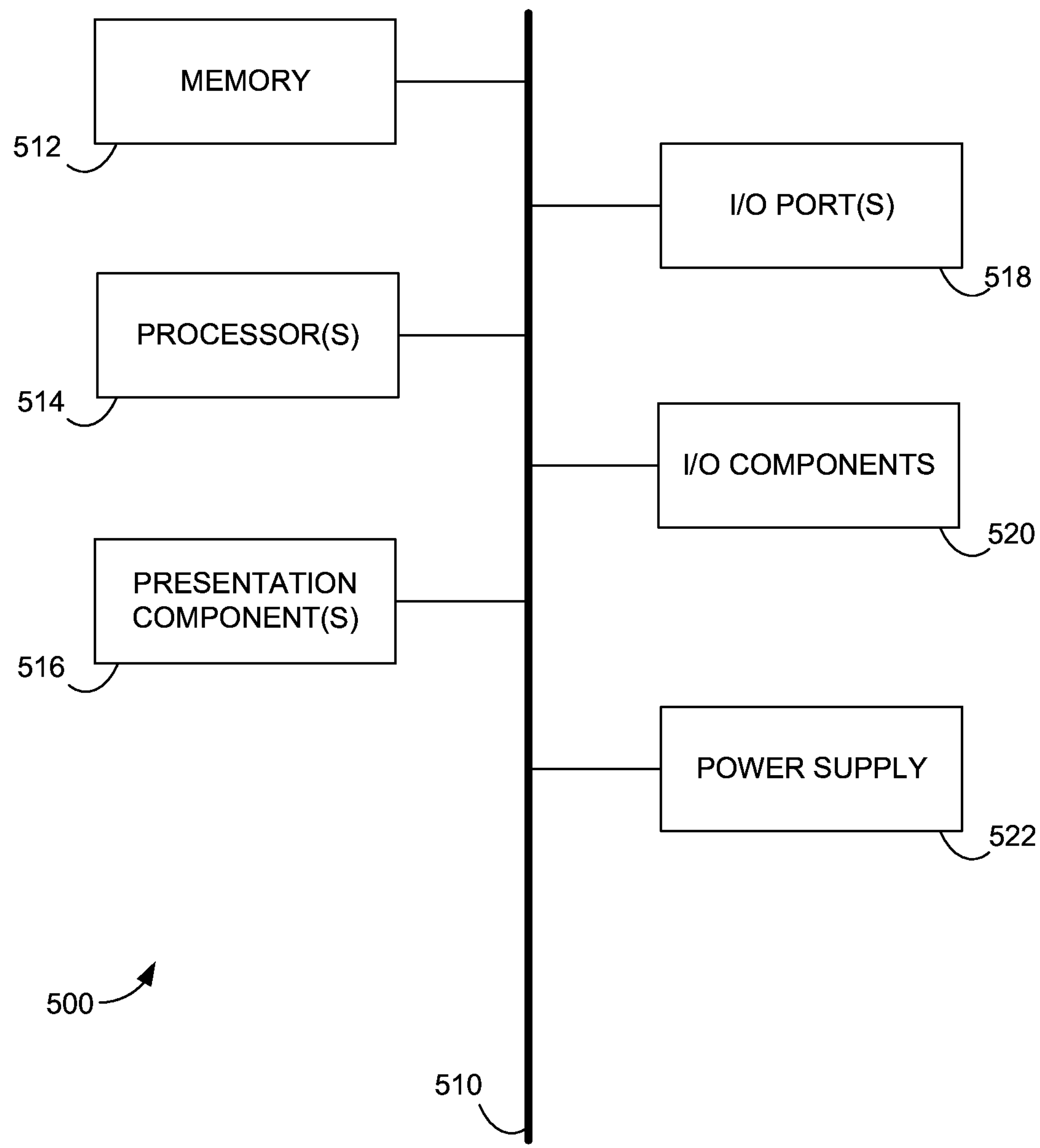
FIG. 5 is a block diagram of an exemplary computing environment suitable for use in implementing embodiments of the present invention.

With continued reference to FIG. 5, the computing device 500 includes a bus 510 that directly or indirectly couples the following devices: memory 512, one or more processors 514, one or more presentation components 516, input/output (I/O) ports 518, input/output components 520, and an illustrative power supply 522. The bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 512 includes computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 420. The presentation component(s) 516 present data indications to a user or other device. Exemplary presentation components include a display device, speaker, printing component, vibrating component, etc.

The I/O ports 518 allow the computing device 500 to be logically coupled to other devices including the I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 4500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:

receiving a post;

creating a post feature vector representative of the post using a set of features that includes at least one text-based feature, and one or more of at least one time-based feature, wherein the at least one time-based feature is based upon time decay and at least one user-based feature, wherein the at least one user-based feature is based upon one of user interests and user participation;

determining whether similarity between the post feature vector and one of a plurality of centroid feature vectors satisfies a minimum similarity threshold, each of the plurality of centroid feature vectors being representative of a respective post cluster associated with a theme and including weighted entities derived from all posts comprising the respective post cluster;

upon determining that similarity between the post feature vector and one of the plurality of centroid feature vectors satisfies the minimum similarity threshold, assigning the post to the respective post cluster of which the one of the plurality of centroid feature vectors is representative; and upon determining that similarity between the post feature vector and any one of the plurality of centroid feature vectors does not satisfy the minimum similarity threshold, creating a new post cluster associated with a new theme and assigning the post to the new post cluster.

2. A computerized theme segmenting engine comprising:

a user-generated post receiving component that receives a plurality of user-generated posts;

a vector creating component that creates a post feature vector representative of each received user-generated post using a set of features that includes at least one text-based feature, and one or more of at least one time-based feature, wherein the at least one time-based feature is based upon time decay, and at least one user-based feature, wherein the at least one user-based feature is based upon one of user interests and user participation;

a similarity assessing component that assesses the similarity between the post feature vector representative of each received user-generated post of the plurality of user-generated posts and a plurality of centroid feature vectors, each of the plurality of centroid feature vectors being representative of a respective post cluster associated with a theme and including weighted entities derived from all posts comprising the respective post cluster; and a post assigning component that, upon determining that similarity between the post feature vector representative of one of the received user-generated posts of the plurality of user-generated posts and one of the plurality of centroid feature vectors satisfies a minimum similarity threshold, assigns the one of the received user-generated posts represented by the post feature vector representative of the one of the received user-generated posts to the respective post cluster represented by the one of the plurality of centroid feature vectors.

3. A computerized method for segmenting themes from user-generated posts, the computerized method comprising:

receiving, by a computing device, a user-generated post from an online community;

identifying, by the computing device, a plurality of entities within the user-generated post, each entity being representative of one feature of a set of features that includes at least one text-based feature, and one or more of at least one time-based feature, wherein the at least one time-based feature is based upon time decay, and at least one user-based feature, wherein the at least one user-based feature is based upon one of user interests and user participation;

assigning, by the computing device, a weight to each entity of the plurality of entities;

creating, by the computing device, a post feature vector based upon the weight assigned to each entity of the plurality of entities;

upon determining, by the computing device, that similarity between the post feature vector and any one of a plurality of centroid feature vectors is below a minimum similarity threshold, each of the plurality of centroid feature vectors being representative of a respective post cluster associated with a theme and including weighted entities derived from all posts comprising the respective post cluster, creating, by the computing device, a new post cluster associated with a new theme; and assigning, by the computing device, the user-generated post to the new post cluster.

* * * * *